(12) United States Patent
Carpenter et al.

(10) Patent No.: US 7,001,084 B2
(45) Date of Patent: Feb. 21, 2006

(54) FIBER SPLICE DEVICE

(75) Inventors: James B. Carpenter, Austin, TX (US); Dale E. Elder, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 184 days.

(21) Appl. No.: 10/748,628

(22) Filed: Dec. 30, 2003

(65) Prior Publication Data

US 2005/0147362 A1 Jul. 7, 2005

(51) Int. Cl.
*G02B 6/255* (2006.01)
(52) U.S. Cl. .......................................... 385/95; 385/97
(58) Field of Classification Search .................... 385/95
See application file for complete search history.

(56) References Cited

U.S. PATENT DOCUMENTS

| | | | | |
|---|---|---|---|---|
| 4,029,390 A | * | 6/1977 | Chinnock et al. ............. | 385/98 |
| 4,254,865 A | * | 3/1981 | Pacey et al. .................. | 385/99 |
| 4,435,038 A | * | 3/1984 | Soes et al. ................... | 385/70 |
| 4,755,018 A | * | 7/1988 | Heng et al. ................... | 385/65 |
| 4,784,456 A | * | 11/1988 | Smith ........................... | 385/55 |
| 4,824,197 A | * | 4/1989 | Patterson .................... | 385/137 |
| 5,013,123 A | * | 5/1991 | Patterson .................... | 385/98 |
| 5,102,212 A | | 4/1992 | Patterson | |
| 5,121,456 A | * | 6/1992 | Essert et al. ................. | 385/70 |
| 5,138,681 A | | 8/1992 | Larson et al. | |
| 5,155,787 A | | 10/1992 | Carpenter et al. | |
| 5,159,653 A | | 10/1992 | Carpenter et al. | |
| 5,274,731 A | * | 12/1993 | White ........................... | 385/135 |
| 5,337,390 A | * | 8/1994 | Henson et al. ................ | 385/81 |
| 5,404,417 A | * | 4/1995 | Johnson et al. .............. | 385/137 |
| 5,416,873 A | * | 5/1995 | Huebscher et al. ........... | 385/99 |
| RE36,146 E | | 3/1999 | Novack et al. | |
| 6,226,434 B1 | * | 5/2001 | Koshiyama et al. ......... | 385/134 |
| 6,661,961 B1 | * | 12/2003 | Allen et al. .................. | 385/135 |
| 2005/0063645 A1 | * | 3/2005 | Carpenter et al. ............ | 385/70 |

FOREIGN PATENT DOCUMENTS

| | | |
|---|---|---|
| DE | 41 02 534 A1 | 8/1992 |
| DE | 41 12 438 C1 | 8/1992 |
| EP | 0 290 188 A2 | 11/1988 |
| JP | 11023879 | 1/1999 |

OTHER PUBLICATIONS

U.S. Appl. No. 10/668,401, filed Sep. 23, 2003, Device for Gripping Optical Fibers.

* cited by examiner

*Primary Examiner*—Ellen E. Kim
(74) *Attorney, Agent, or Firm*—Gregg H. Rosenblatt

(57) ABSTRACT

A fiber splice device includes a body comprising a ductile material. First and second end port sections located on opposite ends of the body are provided and are adapted to receive first and second optical fibers, respectively. The splice device further includes a fiber splicing section, adapted to house a fiber splice, located on the body between the end port sections. The fiber splicing section includes a fiber splice actuation section having a self-locking mechanism integral with the body. The splice device can be used in a variety of locations, such as in the access and metro areas of the fiber optic network, and it is not damaged easily.

21 Claims, 5 Drawing Sheets

FIBER SPLICE DEVICE

BACKGROUND OF THE INVENTION

1. Field of the Invention

The present invention is directed to a device for splicing optical fibers. In particular, the present invention is directed to a one-piece fiber splicing device having a self-locking mechanism.

2. Related Art

Mechanical devices for connecting and/or splicing optical fibers for the telecommunications industry are known. For example, conventional devices are described in U.S. Pat. Nos. 4,824,197; 5,102,212; 5,138,681; 5,159,653; 5,337,390; and 5,155,787.

Another preferred conventional splicing method is fusion splicing. In large deployments, many splices are required to be made in many different areas of the city at the same time. However, as fiber optics are being deployed deeper into the metro and access areas of the network, splicing in these areas of the network are often performed in the air, in cramped closets, and in difficult-to-maneuver locations. Fusion splicing in these types of locations is difficult, and often there is no power available for fusion splicing machine, thus requiring battery power. Also, if many locations are scheduled in a given day, many different installation crews will require fusion splicing machines, resulting in a capital investment for the installation company. Thus, a lower cost, mechanical splicing device that can be activated via a simple low cost tool, and that requires no electrical power, may be desired. This can be an important factor in a flammable environment or an environment where using complicated electronic fusion splicing equipment is difficult.

SUMMARY OF THE INVENTION

According to a first aspect of the present invention, a fiber splice device includes a body comprising a ductile material. First and second end port sections located on opposite ends of the body are provided and are adapted to receive first and second optical fibers, respectively. The splice device further includes a fiber splicing section, adapted to house a fiber splice, located on the body between the end port sections. The fiber splicing section includes a fiber splice actuation section having a self-locking mechanism integral with the body. In an example construction, a first and second hinge sections provide hinges adapted to support a greater than 90 degree bend in the body. Also, a bend region is provided that is adapted to support an about 90 degree bend in the body.

According to another aspect of the present invention, a method of making a fiber splice includes placing first and second optical fibers in first and second end port sections of a fiber splicing device such that ends of the fibers are butted to each other. The fiber splicing device further includes a body of a ductile material, a fiber splicing section, adapted to house a fiber splice, located on the body between the end port sections. The fiber splicing section includes a fiber splice actuation section having a self-locking mechanism integral with the body. The method further includes engaging the fiber actuation section with the self-locking mechanism. In an additional embodiment, the method further includes crimping the surfaces of the first and second end port sections.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The present invention will be further described with reference to the accompanying drawings, wherein.

Figure 1:
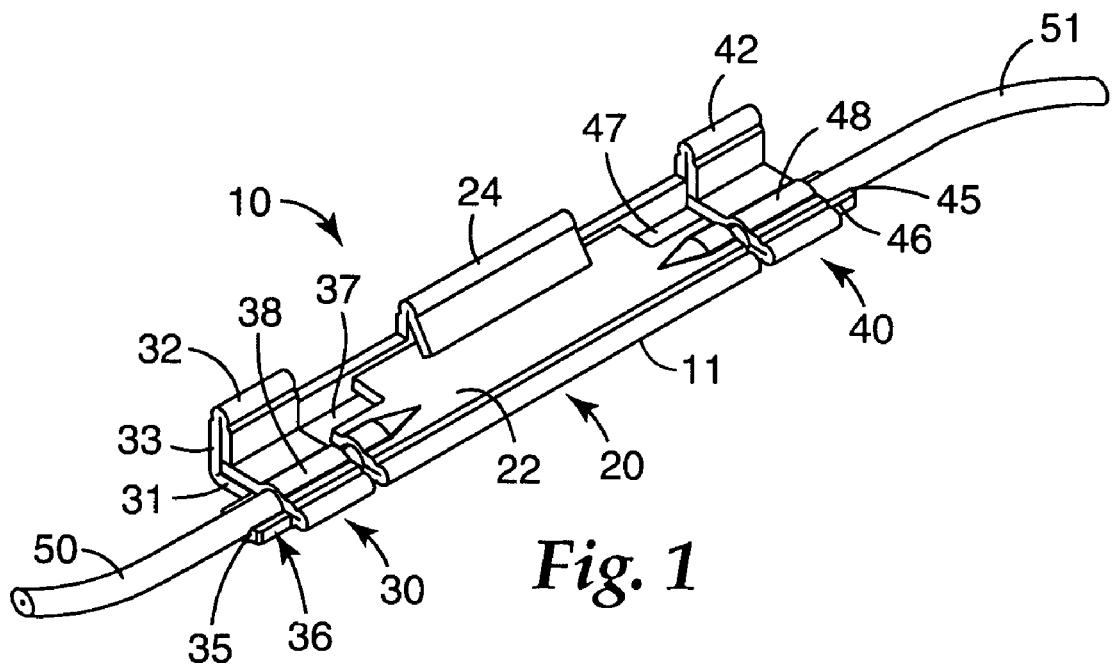
FIG. 1 shows a perspective view of a fiber splice device in an "open" position according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

FIG. 1 shows an isometric, perspective view of an optical fiber splice device 10. The device 10 includes a body, such as a sheet 11, first and second end port sections 30, 40 located on opposite ends of the body, and a fiber splicing section 20 located between the first and second end port sections. The splice device 10 can receive two optical fibers, 50 and 51, whose ends (not shown) are butted against one another in a fiber receiving channel located in the fiber splicing section 20 and are held in place by fiber clamping plate 22 (also referred to as splice plate 22). Fiber splicing section 20 further includes an integral self-locking mechanism 24, such as a central focus cam bar, that locks the fiber clamping plate 22 on the fiber ends to secure the splice. As is described herein, the splice device 10 can be manufactured out of a single material, and thus can be used as a low cost, discrete splice device to butt splice a pair of optical fibers. Splice device 10 can be inexpensive and light in weight. Splice device 10 requires no power, it can be used in a variety of locations, such as in the access and metro areas of the fiber optic network, and it is not damaged easily.

Figure 2:
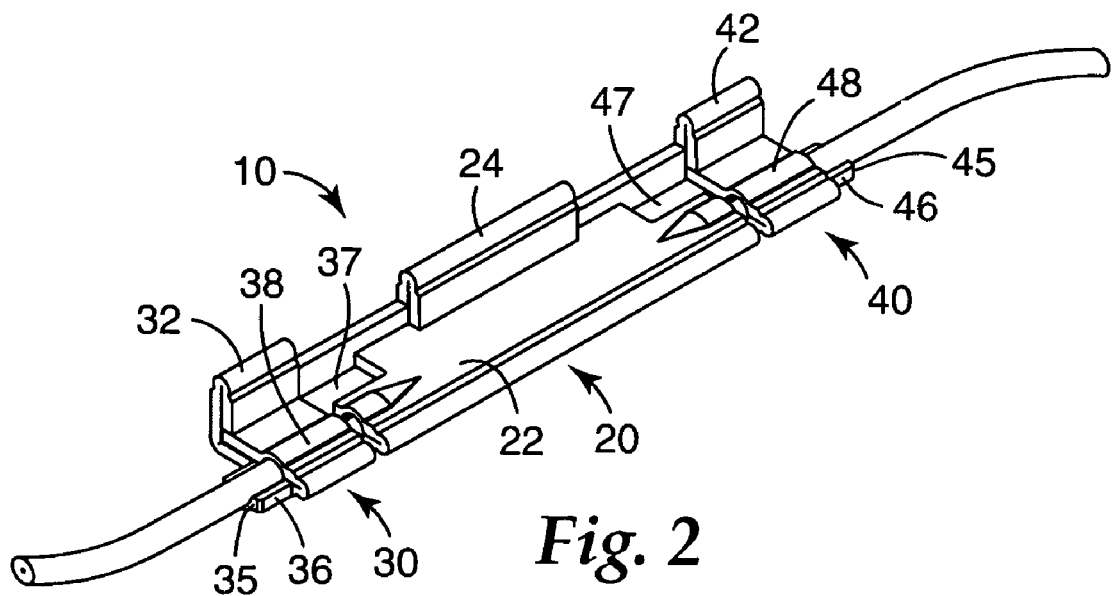
FIG. 2 shows a perspective view of the fiber splice device in a "closed" position.

FIG. 1 shows splice device 10 in an "open," or non-actuated position, ready to receive a pair of optical fibers, and FIG. 2 shows splice device 10 in a "closed," or actuated position, clamped onto the optical fiber pair. A first optical fiber 50 can be inserted in a first end port 35 and a second optical fiber 51 can be inserted in second end port 45. In exemplary embodiments, the optical fiber end regions are stripped of their respective buffer coatings, with each end face polished in a conventional manner. In an open position, the fiber splicing section 20 receives each respective fiber end in a fiber channel (hidden from view in FIGS. 1 and 2, and described further with respect to FIG. 3), which can align and retain the fibers. Optionally, an index matching material, such as a conventional index matching gel, can also be applied in the fiber channel to further facilitate optical coupling. Under actuation, the locking mechanism, shown in FIGS. 1 and 2 as hinged plate 24, acts as a central focus cam bar and is actuated using a pinching action moving the hinged plate 24 towards the backbone 33 of the splice device until contact is made with the splice backbone 33. The actuation movement at the tip of hinged plate 24 closes the fiber clamping plate 22, aligning and retaining the optical fibers. The self-locking mechanism is described further below with respect to FIGS. 6A–6D.

In an exemplary embodiment, splice device 10 includes end ports 35, 45 that are each configured to receive an optical fiber. In exemplary embodiments, end ports 35, 45 each have a tubular shape that can be formed, e.g., through an embossing process. End ports 35, 45 can be constructed as domes or half tubes on the sheet 11, thus creating a circular tube-shaped opening after the folding of sheet 11.

In alternative embodiments, end ports 35, 45 can be configured to have elliptical or other shapes, depending on the desired fiber being spliced. In the open position, the fibers being spliced can be inserted, removed, and/or reinserted into fiber splicing section 20 if a first splice is not successful. End port sections 30, 40 can each further include fiber entrance extensions 36, 46 to further support and help guide fibers 50, 51. Extensions 36, 46 can be shaped as half-tubes and can provide a straightforward visual reference of the location of the end ports without the need to reposition the viewing angle.

End port sections 30, 40 may be secured through end port locking sections 32, 42, respectively. In addition, end port sections 30, 40 can provide crimping regions 38, 48 to further secure the optical fibers being spliced. Prior to crimping or locking operations, described further below, the end ports 35, 45 provide adequate clearance for the passage of the optical fibers 50, 51.

Optical fibers 50, 51 may include conventional (e.g., single mode or multimode) silica (or glass-based) fibers, protective-coated fibers, such as described in U.S. Pat. No. Re. 36,146, POF (Plastic Optical Fiber), and TECS™ (Technically Enhanced Clad Silica) fiber, such as is available from 3M Company, St. Paul, Minn. These fibers may have several standard diameters (including buffer coatings) of about 125 micrometers ($\mu$m) (with or without a buffer coating being removed), 250 $\mu$m outer diameter, and/or 900 $\mu$m outer diameter, as well as nonstandard diameters, e.g., less than 125 $\mu$m, in between 125 $\mu$m and 900 $\mu$m, and larger.

As mentioned above, fiber splice device 10 can be constructed from a single piece of material. In an exemplary embodiment, body 11 is constructed from one piece of deformable material, preferably a ductile metal such as aluminum. An exemplary material is an aluminum alloy conventionally known as "3003", having a temper of 0 and a hardness on the Brinnell scale (BHN) of between 23 and 32. Another acceptable alloy is referred to as "1100", and has a temper of 0, H14 or H15. Acceptable tensile strengths vary from 35 to 115 megapascals. Other metals and alloys, or laminates thereof, may be used in the construction of body 11. Such metals include, but are not limited to, copper, tin, zinc, lead, indium, gold and alloys thereof. In alternative embodiments, a polymeric material, clear or opaque, may be used for body 11. Suitable polymers include polyethylene terephthalate, polyethylene terephthalate glycol, acetate, polycarbonate, polyethersulfone, polyetheretherketone, polyetherimide, polyvinylidene fluoride, polysulfone, and copolyesters such as VIVAK (a trademark of Sheffield Plastics, Inc., of Sheffield, Mass.).

Figure 3:
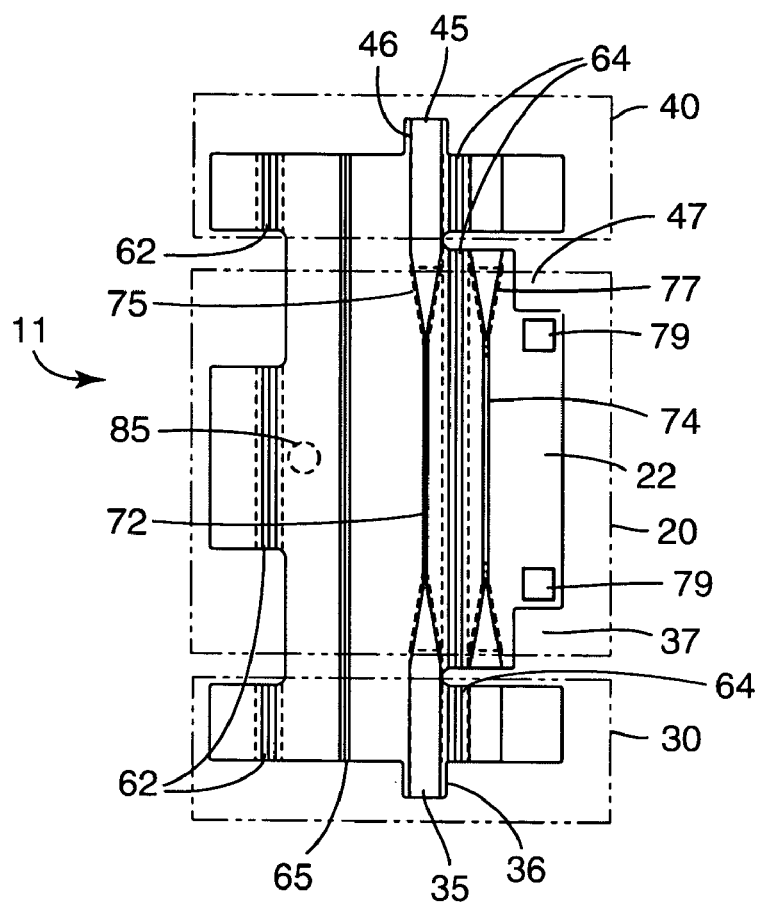
FIG. 3 shows a top view of the body of the fiber splice device prior to folding.

For example, a sheet of aluminum can be used as body 11, and, as shown in FIG. 3, it can have several different geometric shapes coined and/or embossed on both surfaces prior to a bending or folding of the sheet. After the sheet 11 is formed, it can be trimmed to generate the final outside profile shown in FIG. 3.

With further reference to FIG. 3, first and second hinge regions 62 and 64 can be formed on an outside surface of sheet 11, extending generally the length of sheet 11. Hinge regions 62 and 64 can comprise a centrally located groove that can be formed of an area of reduced thickness that defines a hinge that separates sheet 11 into different regions. Such a hinge can be formed in the manner described in U.S. Pat. No. 5,159,653, incorporated by reference herein in its entirety. In addition, a bend region 65 is also provided. In an exemplary embodiment, bend region 65 can be created by coining a notch into sheet 11, such that under folding, a permanent bend of about 90 degrees is provided.

In an exemplary embodiment of the present invention, fiber receiving grooves 72 and 74 are formed on the inside surface of sheet 11, such that when the device 10 is folded, a fiber receiving channel is formed in the fiber splicing section 20. For example, grooves 72 and 74 can be formed in a pre-grooving process, as described in co-owned U.S. patent application Ser. No. 10/668,401 incorporated by reference herein in its entirety. In this embodiment, grooves 72 and 74 are configured to provide guidance and alignment to the fiber portions being spliced. In addition, when the grooves are formed in a pre-grooving process, mechanical compressive forces can be uniformly applied to the outer diameter of the fibers. Such substantially evenly distributed compressive forces can help ensure one or more of the following: coating integrity and reliability, axial alignment between two fibers held in the device, and mechanical fiber retention for the lifetime of the device.

In an exemplary embodiment, grooves 72 and 74 are each substantially semi-circular in shape and are generally parallel with hinge region 64, and equidistant therefrom. For example, a pre-grooving process can be used to form grooves that can contact 300 degrees of the outer perimeter of the fiber. In another example, a fiber can be contacted on about 340 degrees of its outer diameter, or more. Alternatively, one or both of grooves 72, 74 can be formed as conventional V-grooves.

In addition, grooves 72 and 74 can extend along a substantial portion of the fiber splicing section 20.

In an exemplary embodiment, sheet 11 further includes recesses or conical groove sections 75 and 77 that can be formed to lie at both ends of grooves 72 and 74, respectively, such that when the sheet 11 is folded, (as shown in FIGS. 1 and 2), recesses 75 and 77 form a funnel-shaped lead-in fiber receiving region or cone for an optical fiber. These funnel-shaped lead-in fiber receiving regions or cones can be used to guide optical fibers into the fiber alignment grooves 72 and 74.

Also, sheet 11 can further include cutout sections 37, 47 located on each side of the fiber clamping plate 22. These cutouts 37, 47 can be used for manufacturing purposes, as described below. In addition, body 11 can optionally further include one or more clamp relief pads 79 and an access hole 85. Clamp relief pads 79 can be used in conjunction with the locking mechanism or plate 24.

For example, in an exemplary embodiment, such as shown in FIGS. 1 and 2, the length of central focus cam bar or plate 24 is shorter than the length of the fiber clamping plate 22. The pads 79 can be located on the fiber clamping plate 22, outside the length of the locking plate 24. In operation, when the locking plate 24 is closed, optical fibers 50, 51 located in the fiber receiving channel formed by opposing grooves 72, 74 are clamped into place. Nevertheless, the clamping forces may cause the fibers 50, 51 to displace the material forming the body 11, e.g., aluminum, depending on the fiber type being spliced (e.g., silica fibers are harder than aluminum). When these clamping forces are not released gradually, micro bending of the fibers may occur at the point where the fiber exits the groove. This abrupt transition of high clamping forces to no clamping forces can create higher insertion losses. Clamp relief pads 79 provide for a gradual release of the clamping force by separating the fiber clamping plate 22 from the base 31 to reduce the effects of micro bending.

The optional access hole 85 can be formed through the splice backbone 33 across from the locking plate 24. The access hole 85 can be used to open the locking plate 24 by, e.g., pushing a small diameter pin or rod (not shown) through the hole 85 onto the locking plate 24 until it opens. While frequent openings of the locking plate 24 can reduce the integrity of the hinge 62, the splice device 10 can be used for more than one splicing operation. A minimal opening distance of plate 24 can extend hinge life and integrity.

Figure 4A:
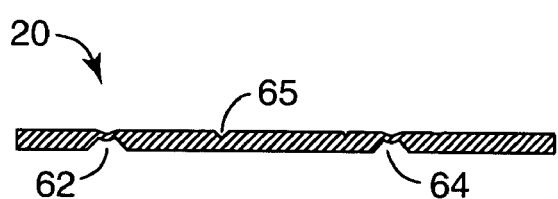
FIGS. 4A–4D show an exemplary procedure for folding the fiber splicing section of the fiber splice device.
Figure 4C:
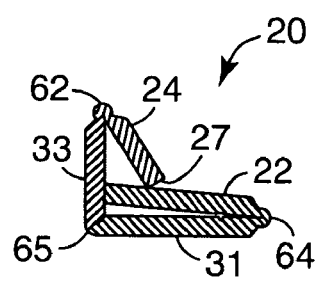
Figure 4B:
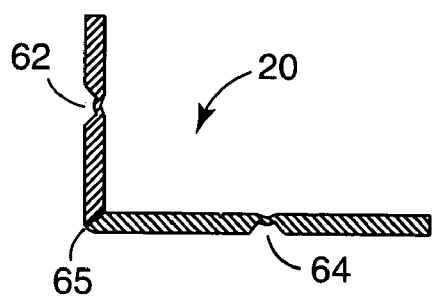
Figure 4D:
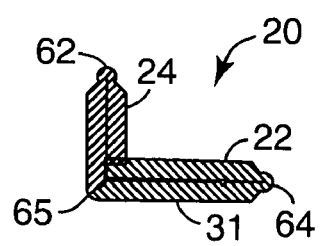

An exemplary folding operation is shown schematically in FIGS. 4A–4D and 5A–5C. For example, FIGS. 4A–4D show a folding sequence for fiber splicing section 20. As mentioned above, sheet 11 can include first and second hinge portions 62 and 64, and can further include a bend region 65. In FIG. 4B, a 90 degree or so bend is formed about bend region 65. FIG. 4C represents the aforementioned open position of the fiber splicing section. First, the fiber clamping plate 22 is bent at hinge point 64 and is oriented at a smaller angle, e.g., about 3 degrees to about 10 degrees, from the base portion 31. Second, the locking plate 24 is bent obliquely about hinge 62 to an angle of about 20 to 40 degrees from the vertical backbone 33 of the device. In this position, the fiber can be inserted in the groove region of the fiber splicing section 20. The tip 27 of the locking plate 24 is then moved in the direction of vertical backbone 33 in a lever-type manner to push the fiber clamping plate 22 toward base 31, thus actuating or closing the splice device, as is shown in FIG. 4D.

Figure 5A:
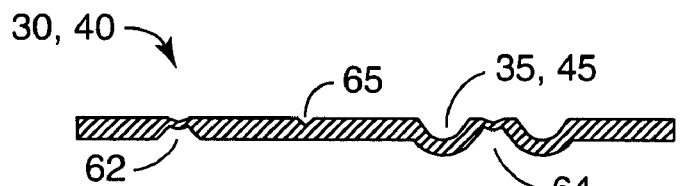
FIGS. 5A–5C show an exemplary procedure for folding the end port section of the fiber splice device.
Figure 5B:
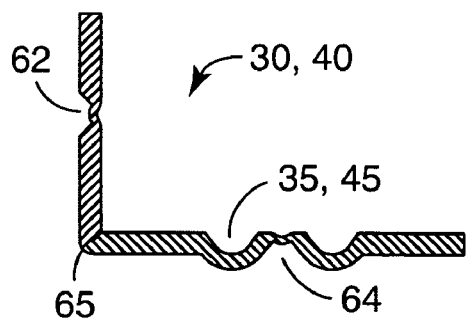
Figure 5C:
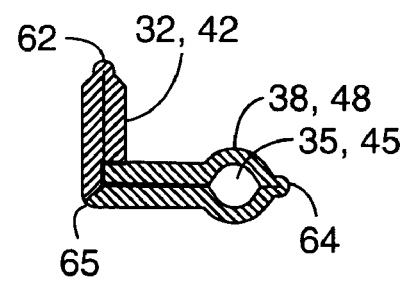

The fiber end port sections 30, 40 can be folded in a similar manner, as is illustrated schematically if FIGS. 5A–5C. For example, in FIG. 5A, end ports 35, 45, shown as half-tubes, are formed about hinge region 64. In FIG. 5B, a 90 degree or so bend is formed about bend region 65. In FIG. 5C, the folded structure is shown, where end ports 35, 45 can form a tube-shaped receptacle for receiving the optical fibers being spliced together. End port locking sections 32, 42 can secure the end port regions 30, 40 in a manner similar to the locking mechanism described above with respect to the fiber splicing section 20. Crimp regions 38, 48 can also be provided to receive a crimping device, described in more detail below with respect to FIGS. 7A–7B, to crimp the respective fibers in end ports 35, 45, to further secure the optical fibers in place after actuation of the fiber splicing section.

Figure 6A:
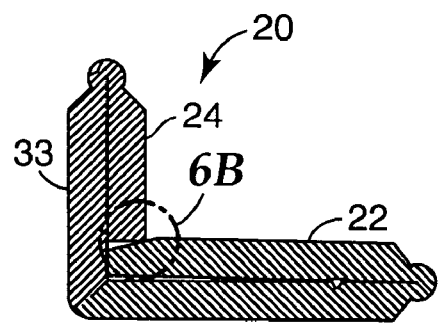
FIGS. 6A and 6B show an end view of a first embodiment of a self-locking mechanism of the fiber splice device and FIGS. 6C and 6D show an end view of a second embodiment of the self-locking mechanism of the fiber splice device.
Figure 6C:
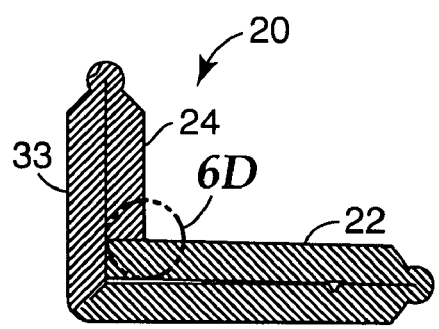
Figure 6B:
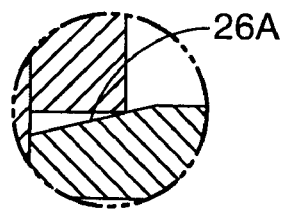
Figure 6D:
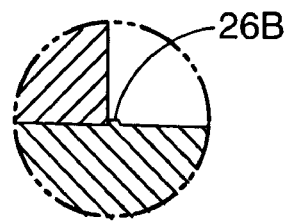

In accordance with exemplary embodiments, in the closed position, stress is induced in the hinge areas on both the locking mechanism and the fiber clamping plate, which forces the respective plates towards an open portion. The structure of the splice device of the present invention is designed to counteract these forces, one opposing the other, to maintain closure of the splice device through the use of a self-locking mechanism. For example, FIGS. 6A and 6B illustrate a first embodiment of a self-locking mechanism, where a taper 26A is formed on the tip of the fiber clamping plate 22. This design creates a ramped recess at or near the intersection between the locking plate 24 and the fiber clamping plate 22. In an alternative embodiment, FIGS. 6C and 6D show a raised structure 26B, such as a bump or ridge, that is formed (e.g., by embossing, stamping, coining, or the like) on the surface of the fiber clamping plate 22 at or near the intersection between the locking plate 24 and the fiber clamping plate 22. This raised structure 26B prevents the movement of locking plate 24 away from vertical backbone 33. Thus, the fiber splice device 10 can include a self-locking mechanism, integral with the splice device structure itself, thereby avoiding the requirement for a separate structure to lock the splice in place. As would be apparent to one of ordinary skill in the art given the present description, other integral locking structures can also be utilized.

The folding operation (that transforms sheet 11 into a working splice device 10) can be performed manually, with a machine, or with a combination of both. For example, the material can be formed and cut from a strip in a manual or progressive die, or combination, resulting in sheet 11. The bend region 65 can also be bent in the manual and/or progressive die. Sheet 11 can be transferred by human action and/or with automation, into a folding/gelling/date-coding machine (not shown). A set of locating and clamping fingers (not shown) can be used to move vertically down onto the flat sheet 11, locating into the cutout areas 37, 47 (shown in FIGS. 1–3), that can also contain a precisely sized and positioned hole (not shown) in each cutout, which can be used to provide minor location corrections. Using clamping fingers in this location, hinges 62 and 64 (described with respect to FIGS. 4C–4D and 5C), and optionally bend region 65, can be formed in one setup. Clamping fingers having locating pins that fit into the cut-out holes previously described (not shown) can also provide a location and a guided travel mechanism to an automated optical index matching gel-dispensing head (not shown). After the splice is folded and gelled, an automated pick and place arm can remove the splice device 10 from the machine nest. As the splice device 10 is transferred out of the folding nest, it can pass under an ink jet printer head where the date code can be printed onto the outside of the splice.

Figure 7A:
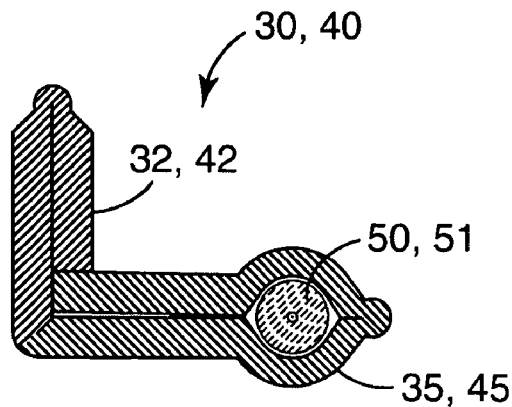
FIGS. 7A and 7B show end views of an end port section of an example fiber splice device designed for 900 micrometer buffer coated optical fiber before and after crimping a first exemplary fiber.
Figure 7B:
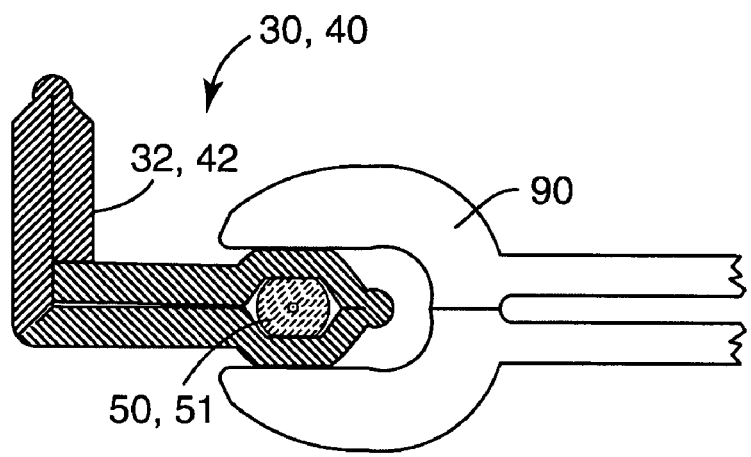

As mentioned above, crimping can also be performed to further secure the fibers being spliced and to prevent torsional movement of the fibers. An exemplary crimping procedure is illustrated in FIGS. 7A–7B. In FIG. 7A, a cross-sectional end view of end port region 30 (or 40) is shown. In this example, a buffered fiber 50, 51, having an outer diameter of about 900 micrometers, is received in the end port 35, 45. After a splice is actuated in the fiber splicing section, the optical fiber can be further secured in splice 10 by crimping the end port with a crimping tool 90, shown in FIG. 7B as a vice-grip-type implement, that can compress the tube-shaped end ports. This crimping action can provide axial and torsion strain resistance. Of course, other types of optical fibers can be spliced using the splice device of the embodiments described herein. According to an alternative embodiment, the crimping tool 90 can be formed as an integral part of the splice actuation tool to minimize tool cost and increase tool versatility.

Figure 8:
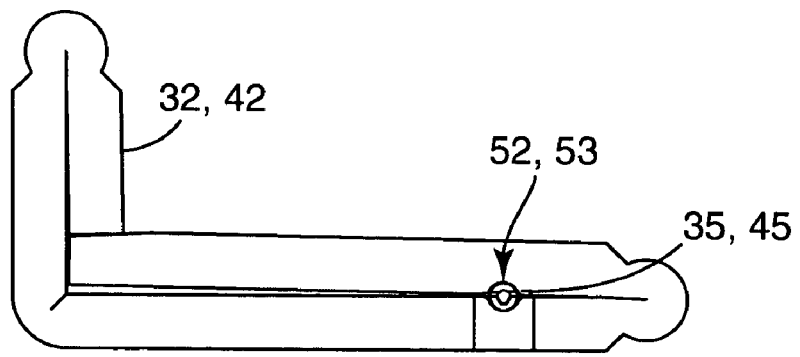
FIG. 8 shows an end view of a second embodiment of an end port section of an example fiber splice device designed to receive 250 micrometer buffer coated optical fiber.

FIG. 8 shows different exemplary fibers 52, 53, such as 250 micrometer diameter buffered fibers, in a second embodiment end port designed for receiving 250-micrometer diameter buffered fibers.

Figure 9A:
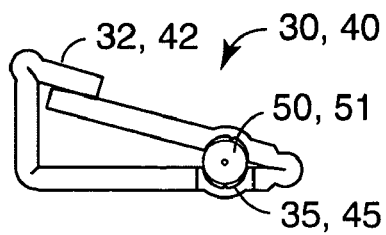
FIG. 9A shows an end view of a non-actuated end port section receiving a first exemplary 900 micrometer fiber.
Figure 9B:
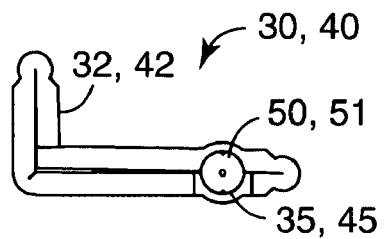
FIG. 9B shows an end view of an actuated end port section gripping an exemplary 900 micrometer fiber.
Figure 9C:
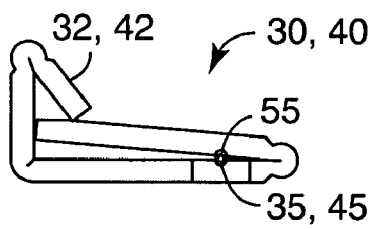
FIG. 9C shows an end view of a non-actuated end port section receiving an exemplary 250 micrometer fiber.
Figure 9D:
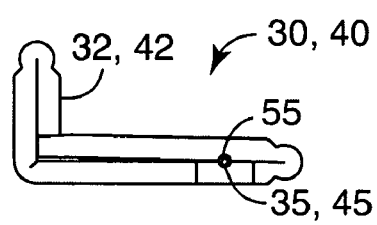
FIG. 9D shows an end view of an actuated end port section gripping a second exemplary 250 micrometer fiber.

According to a further alternative embodiment, strain relief can also be accomplished using a modified design and procedure. For example, as shown in FIGS. 9A and 9B, the end port sections 30, 40 can have "open" and "closed" positions, similar to the open and closed positions of the fiber splicing section 20. In the open position, e.g., as shown in FIG. 9A, the fiber 50, 51 (here, an exemplary 900 micrometer outer diameter buffered silica fiber) can be inserted in end ports 35, 45. After the splice is actuated in the fiber splicing section 20, the end port sections 30, 40 can be moved into a closed position by actuating the end port locking plates 32, 42, in a manner similar to that described above. In addition, self-locking mechanisms, such as those described above, can also be employed in the end port sections 30, 40. Further, small teeth or similar structures can be formed (e.g., by coining) into the interior surface of the tube-shaped end ports 35, 45. Upon closing, the teeth can penetrate and secure the buffered outer coating of the fiber 50, 51 to the end port sections 30, 40. Similarly, as schematically shown in FIGS. 9C and 9D, this alternative end port section structure can be utilized with a different sized optical fiber, such as a 250 micrometer outer diameter buffered fiber, 55.

Figure 10A:
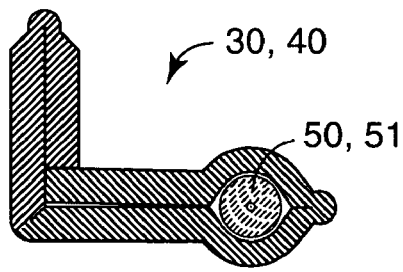
FIGS. 10A–10C show end views of an end port section that can be modified to guide and/or crimp different diameter fibers.
Figure 10B:
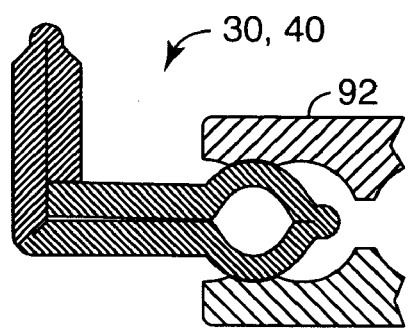
Figure 10C:
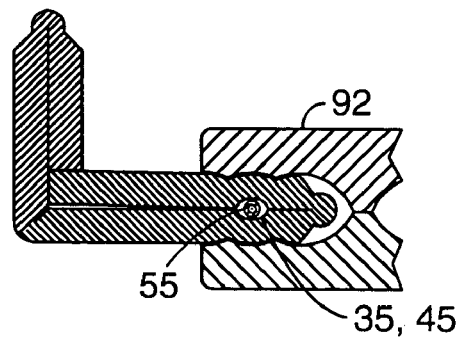

FIGS. 10A–10C show another alternative embodiment, where the splice device can be utilized to splice optical fibers having any outer diameter. FIG. 10A shows end port section 30, 40 that is sized to receive an optical fiber, 50, 51, having a first outer diameter, e.g., 900 micrometers. FIG. 10B shows a crimping tool 92 that can alter or resize one or more end port. In FIG. 10C, end port 35, 45 can now receive an optical fiber having a different outer diameter, such as a 250 micrometer buffer coated fiber 55. Thus, the crimping tool 92 may have two or more crimping positions. For example, a first position would size the splice device to accommodate a 250 micrometer buffer coated fiber, while the second position would crimp the splice onto the 250 micrometer buffer coated fiber to provide additional strain relief. In this alternative embodiment, one splice device can be used to splice fibers having different sized buffer coatings, while using the same cleave length for both buffer sizes.

In addition, the splice device of the present invention can be a small, lightweight device. For example, the footprint of the entire device can be on the order of 0.75 inches or greater. In one example, the footprint for the device can be about 1.2 inches in length, about 0.2 in. in width, and about 0.145 in. in height. Of course, other sizes would be apparent to one of ordinary skill in the art given the present invention.

The splice device of the embodiments of the present invention can thus provide a straightforward method of splicing optical fibers in the field. For example, first and second optical fibers can be placed in the first and second end port sections of a splicing device 10 such that ends of the optical fibers are butted to each other. Then, the fiber splicing section 20 can be actuated to complete the splice, with the self-locking mechanism 24 fastening the clamping plate securely on the spliced fiber ends. Further strain relief can be provided by crimping the end port sections or engaging teeth formed in the end ports to grab the extended portions of the fibers.

As fiber optics are deployed deeper into the metro and access areas of a network, the benefits of such mechanical interconnection products can be utilized for Fiber-To-The-Home/Desk/Building/Business (FTTX) applications. The devices of the present invention can be utilized in installation environments that require ease of use when handling multiple splices and connections, especially where labor costs are more expensive.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. A fiber splice device, comprising:
   a body comprising a ductile material;
   first and second end port sections located on opposite ends of said body adapted to receive first and second optical fibers, respectively; and
   a fiber splicing section, adapted to house a fiber splice, located on said body between said end port sections, wherein said fiber splicing section includes a fiber splice actuation section having a self-locking mechanism integral with said body;
   a first hinge section to provide a hinge adapted to support a greater than 90 degree bend in the body;
   a second hinge section to provide a hinge adapted to support a greater than 90 degree bend in the body; and
   a bend region adapted to support an about 90 degree bend in the body.

2. The fiber splice device according to claim 1, wherein said body consists of a single piece of metal.

3. The fiber splice device according to claim 1, wherein said end port sections and said fiber splicing section are integral with said body.

4. The fiber splice device according to claim 1, wherein said fiber splicing section comprises a central focus cam bar.

5. The fiber splice device according to claim 4, wherein said self-locking mechanism comprises a reverse taper portion located on a portion of said body such that when said body is bent about said first and second hinge sections and said bend region, the reverse taper portion receives said central focus cam bar.

6. The fiber splice device according to claim 5, wherein said reverse taper portion provides an opposing force to a force generated by said central focus cam bar.

7. The fiber splice device according to claim 4, wherein said self-locking mechanism comprises a raised bump on a surface of said body to receive said central focus cam bar and to retain a locked position of said central focus cam bar.

8. The fiber splice device according to claim 4, further comprising an access hole disposed in said body across from said central focus cam bar adapted to receive a displacement mechanism to displace said central focus cam bar from a locked position.

9. The fiber splice device according to claim 4, further comprising clamp relief pads disposed on a surface of said body and adapted to contact a fiber clamping plate when actuated and to provide a gradual clamping force when the central focus cam bar applies a clamping force on the fiber clamping plate.

10. The fiber splice device according to claim 1, wherein the end port sections provide torsional strain relief.

11. The fiber splice device according to claim 1, wherein the first and second end port sections receive first and second fibers having a buffer outer diameter of about 900 micrometers or less.

12. The fiber splice device according to claim 1, wherein the first and second end port sections receive first and second fibers having a buffer outer diameter of approximately 250 micrometers or less.

13. The fiber splice device according to claim 1, wherein the first and second end port sections each include tube-shaped ports.

14. The fiber splice device according to claim 13, wherein at least one end port includes an extension that protrudes from said body.

15. The fiber splice device according to claim 13, wherein at least one end port is adapted to be resizable to accommodate different-sized buffer coated optical fiber.

16. The fiber splice device according to claim 1, wherein the fiber splicing section includes a fiber receiving channel.

17. The fiber splice device according to claim 16, wherein the fiber receiving channel includes a conical portion and a V-groove.

18. The fiber splice device according to claim 16, wherein the fiber receiving channel includes a pre-grooved channel.

19. The fiber splice device according to claim 16, wherein the fiber receiving channel includes an index matching fluid.

20. A method of making a fiber splice, comprising:
placing first and second optical fibers in first and second end port sections of a fiber splicing device such that ends of said fibers are butted to each other, the fiber splicing device further including a body comprising a ductile material, a fiber splicing section, adapted to house a fiber splice, located on said body between said end port sections, wherein said fiber splicing section includes a fiber splice actuation section having a self-locking mechanism integral with said body wherein the fiber splicing device further includes a first hinge section to provide a hinge adapted to support a greater than 90 degree bend in the body; a second hinge section to provide a hinge adapted to support a greater than 90 degree bend in the body; and a bend region adaoted to support an about 90 degree bend in the body; and
engaging said fiber actuation section with the self-locking mechanism.

21. The method according to claim 20, further comprising crimping the surfaces of the first and second end port sections.

* * * * *

UNITED STATES PATENT AND TRADEMARK OFFICE
CERTIFICATE OF CORRECTION

| | | |
|---|---|---|
| PATENT NO. | : 7,001,084 | Page 1 of 1 |
| APPLICATION NO. | : 10/748628 | |
| DATED | : February 21, 2006 | |
| INVENTOR(S) | : Carpenter, James B. | |

It is certified that error appears in the above-identified patent and that said Letters Patent is hereby corrected as shown below:

<u>Column 10,</u>
Line 22, delete "adaoted" and insert -- adapted -- therefor.

Signed and Sealed this

Fifteenth Day of August, 2006

JON W. DUDAS
*Director of the United States Patent and Trademark Office*